June 13, 1961     A. D. CAMINITI     2,988,135
AUXILIARY SEAT FOR MOTOR VEHICLES AND THE LIKE
Filed Nov. 17, 1958     3 Sheets-Sheet 1
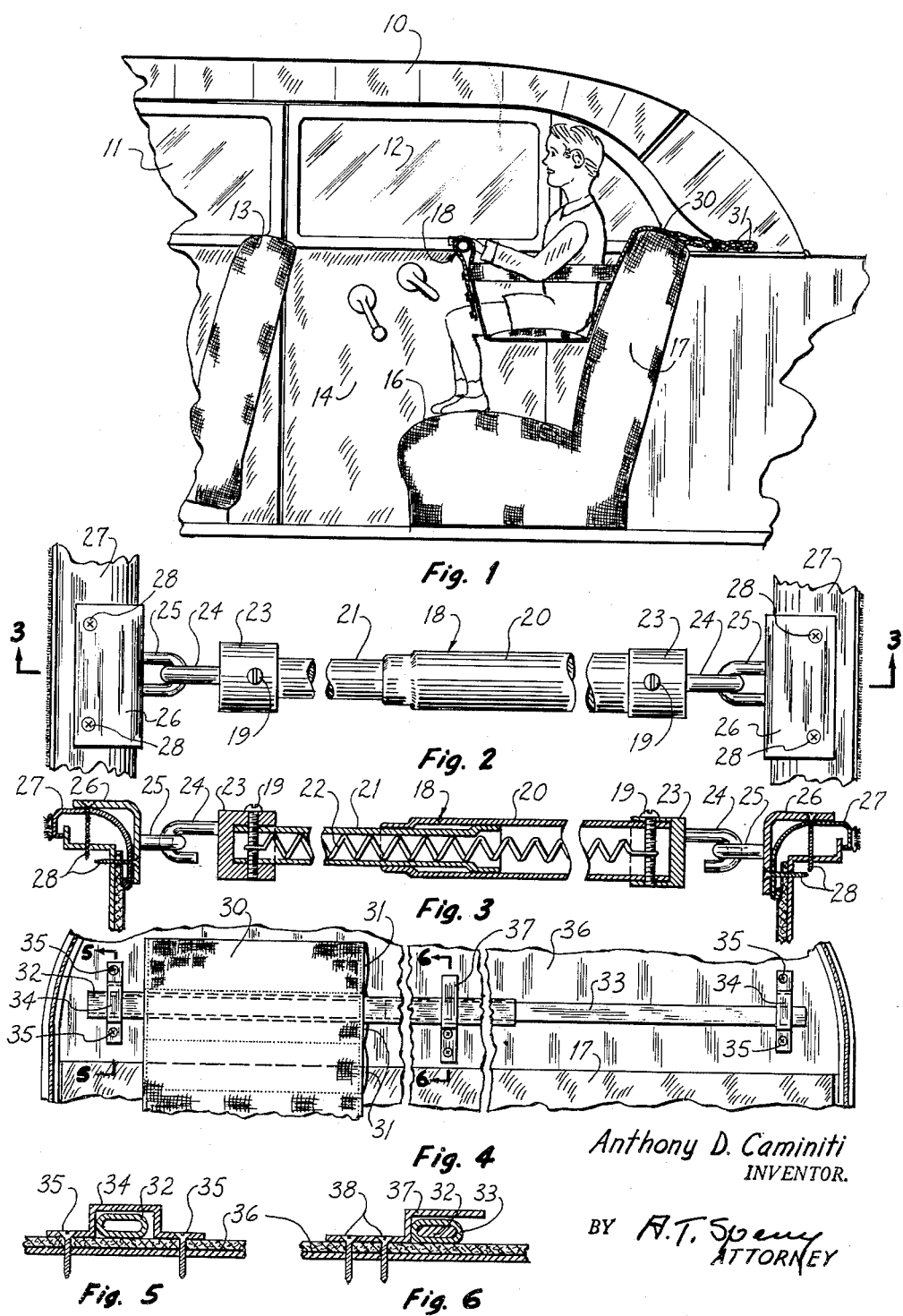
Anthony D. Caminiti
INVENTOR.
BY A. T. Sperry
ATTORNEY Anthony D. Caminiti
INVENTOR.

BY H. T. Sperry
ATTORNEY

June 13, 1961 A. D. CAMINITI 2,988,135
AUXILIARY SEAT FOR MOTOR VEHICLES AND THE LIKE
Filed Nov. 17, 1958 3 Sheets-Sheet 3

Anthony D. Caminiti
INVENTOR.

BY A. T. Sperry
ATTORNEY

United States Patent Office 2,988,135
Patented June 13, 1961

2,988,135
AUXILIARY SEAT FOR MOTOR VEHICLES AND THE LIKE
Anthony D. Caminiti, 3824 Santiago, Tampa, Fla.
Filed Nov. 17, 1958, Ser. No. 774,435
7 Claims. (Cl. 155—10)

While certain aspects of the present inventive concept may be broadly applicable for the support, seating, securement, and protection of infants, adults, injured, ill, infirm, or crippled persons as well as for the support and retention and protection of animals, the inventive concept is here shown as designed for the seating of infants. It is also to be noted that while certain objects, features, and advantages of the present invention are applicable in a wide variety of associations the invention is presented, by way of examples, as in use for the seating of infants in vehicles such as cars, boats, airplanes or the like. The present form of the device here shown by way of example is designed for the safe, secure, and comfortable seating of the infants in an elevated position over the usual adult seat of a motor vehicle.

Many varied types of auxiliary seats for infants to be permanently or temporarily attached to seat structures of motor vehicles for the support and retention of an infant have been patented and many have been commercially successful. However, much remains to be desired with respect to simplicity of structure, durability of design, adequate support, securement, and safety means precluding injury to the infant in the event of accident. Since the number and variety of previously patented and/or commercialized infant's seats for motor vehicles, is so large and structures so varied, it is deemed more appropriate to confine the preamble of the following specification to a statement of the applicant's invention rather than to attempt a detailed discussion of the distinguishing features as compared with the prior art. Thus the present form of the invention may be broadly defined as providing one or more seat units primarily supported by a transversely extending relatively rigid member. More specifically the invention comprehends the provision of a rigid transverse bar extending within and across a vehicle in spaced relation to the usual seat and back cushions and the forward portion of the auxiliary seat.

In the presently preferred form of the invention the seat unit extends downwardly from the rigid bar by way of front securing straps or their equivalent, preferably adjustable as to length and disposed in a generally vertical position. The horizontal support or bottom of this form of the seat unit extends in a generally horizontal plane rearwardly from the lower ends of the front securing straps toward the usual back cushion of the vehicle seat. The rear edge of the bottom is preferably supported by an upwardly extending apron which may rest against the upper portion of the normal back cushion. The apron is here shown as extending over the top edge of the back cushion to be transversely secured. Among the important features of the invention is the construction and arrangement of the seat units whereby a plurality of such units may be as selectively arranged in such number and at such spacing on the bar as to provide for the comfortable and secure seating of a number of children. Another important feature of the seat unit is the provision of adjustability whereby the vertical extent of the front portion downwardly from the bar may be conveniently altered; so also may the attachment of the outer end of the apron be varied. Hence not only may the seat unit be adjusted as to height and to conform with the size of the child but the angularity of the bottom may be varied. Such adjustability renders the unit universally applicable to a wide variety of makes and models of vehicles regardless of seat arrangements and contours.

It will be understood of course that the several seat units herein disclosed incorporate several inventive concepts independent of the manner or means of their support attachment and securement. However, the total inventive concept is not limited nor confined to these specific forms of seat units. Other and varied types, designs and constructions may be used in the full combination without departure from the spirit of the invention or the scope of the claims.

It is also to be understood that the invention as to the seat structures themselves or as to the mounting and supporting means is not limited to use as an auxiliary child's seat for motor vehicles such as cars, boats, airplanes or the like. Various aspects of the inventive concept are applicable to provide auxiliary seating in various locations for both adults and infants. Furthermore, a combination of the seats here shown or a simple modification thereof may provide full length support of a person in horizontal position.

The supporting bar of the present invention may extend fully across the tonneau of the vehicle at a point approximately level with the lower edge of the window, thus substantially above the seat cushion and spaced well in advance of the back cushion. The invention is not so limited however and embraces the concept of a bar extending only partially over the normal seat. While the bar may be defined as rigid the term is used in a relative sense to imply a firm transverse member. A flexible element such as rope or cable may be so disposed and secured as to fulfill the intent of this terminology. It will also be seen that the bar may be extensible preferably in a telescopic manner. Such extension may be by a fixed adjustment or by yieldable spring means. The rigidity referred to is thus with respect to the longitudinal axis as distinct from the length of the bar. Not only does the bar support the seat unit but by its securement to the sides of the vehicle independently of the normal seats it acts to preclude inadvertent forward displacement of the seat occupant. The preferable securement of the ends of the bar, either by positive or yieldable attachment to the doors, provides a most important safety factor by the locking of the doors in closed position, precluding accidental opening thereof by the infant or in the event of a motor vehicle accident. A further feature of the invention is the ready removability of the bar and the arrangement by which the bar and the seats may be folded into a position of non-use without complete removal of the seating unit or units from the vehicle.

These and numerous other objects, features and advantages of the present invention will be apparent from a consideration of the following specification taken in conjunction with accompanying drawings in which, FIGURE 1 is an interior fragmentary view of the rear portion of a motor vehicle showing one form of the present invention supporting an infant, FIGURE 2 is a top plan view of one form of the seat supporting bar and its manner of attachment to the car doors or frame, FIGURE 3 is a longitudinal section taken along line 3—3 of FIGURE 2.

FIGURE 4 is a fragmentary top plan view showing the means of retaining the back apron of one of the seat units.

FIGURE 5 is a section view taken on line 5—5 of FIGURE 4.

FIGURE 6 is a detailed section taken on line 6—6 of FIGURE 4.

Figure 11:
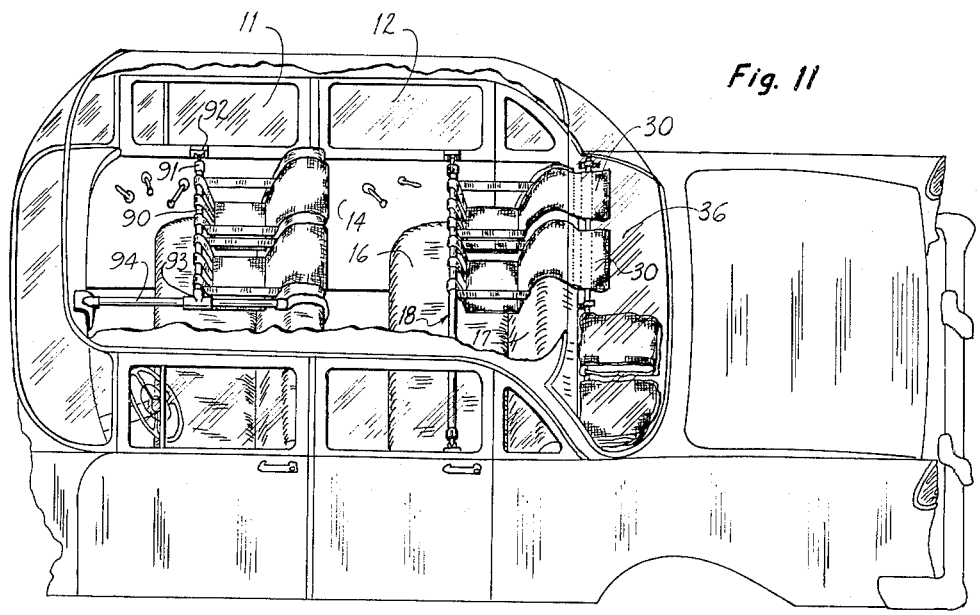
FIGURE 11 is a view illustrating a plural arrangement of seats of the present invention taken as a broken-away top view of a motor vehicle.

Referring now to the drawings it will be seen that in FIGURE 1 there is depicted a conventional four-door sedan including the roof structure 10, front and rear windows 11 and 12 respectively, a front seat 13, a rear side door 14, and a rear seat including the seat cushion 16 and the back cushion 17. Across the rear portion of the tonneau formed between the side doors there is provided the transversely extending generally rigid supporting bar 18 of the present invention. The bar 18 of one preferred form of the invention shown in detail in FIGURES 2 and 3 is telescopic including an outer tubular element 20 which slidably receives therein a companion tube 21. A coil spring 22 secured by screws 19 urges the tube 21 inwardly in telescopic relation to the tube 20. The outer free ends of the tubes 20 and 21 are provided with caps 23 rigidly and permanently secured thereto by the screws 19 from which extends a body engaging hook 24. The hooks 24 are adapted to be engaged over links 25 suitably secured in any desired manner with the door side panel or other element of the car body. In the present form of the invention the links 25 are rigidly mounted by bracket members 26 secured through the window ledge 27 of the door panel by screws 28. A similar assembly of cap, hook, link and bracket bearing like members is provided on the protruding end of the tube 21. It will be understood that the invention is not in any way limited to this manner of securement of the bar nor to the specific location of the bar as herein suggested, but it is in fact contemplated that the invention comprehends the provision of a transverse fixed rod which may extend only partially across a seat as shown in Figure 11 or where the invention is applied to the front seat of the vehicle.

Figure 12:
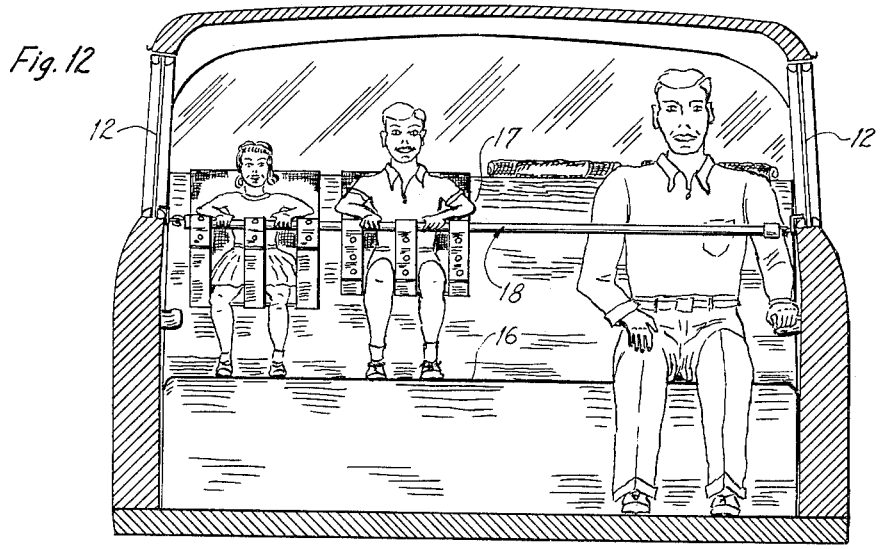
FIGURE 12 is a front elevation of the rear seat arrangement of FIGURE 11.

In FIGURE 4 there is disclosed one form of securement for the upper and outer free end 30 of the apron of the seat unit. The apron end 30 is formed to provide parallel spaced rod receiving tunnels 31 formed by transverse stitchings through a return fold of the said outer end 30. Through a selected tunnel 31 there is an inserted telescopic rod here shown as including an outer element 32 and a smaller inner element 33. The outer extremities of the rod elements are adapted to be received within terminal securing eyes 34 as shown in detail in FIGURE 5 which may be secured by the screws 35 to the conventional deck 36 behind the rear seat cushion 17. L shaped brackets 37 as shown in detail in FIGURE 6 may be secured to the deck by screws 38 to provide intermediate bracing and retention of the rods. While it is of course required that the bar 18 be released from its securement when the seat units are to be folded away in a position of non-use, it is suggested that the rod of FIGURE 4 may be more or less permanently retained in position. The disengagement of the bar 18 or of the seat units from the bar will permit the seat units to be folded back upon the deck 36 as seen in FIGURES 11 and 12. With the rod retained in such position the bar may be lodged with the seat units on the deck 36 and retained in engagement therewith. When only certain seat units are in use others may be detached from the bar 18 and folded over the deck 36 without detaching from the rod.

Figure 7:
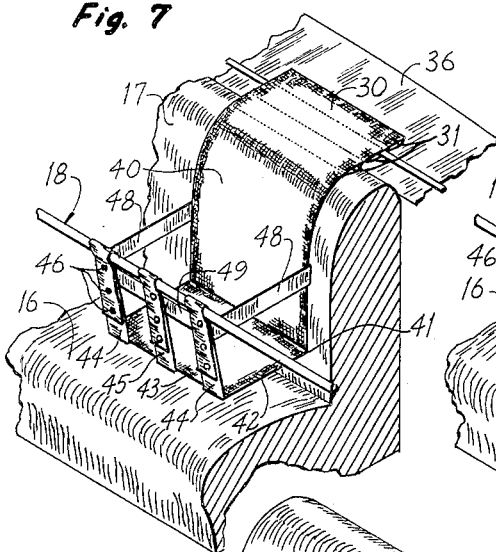
FIGURE 7 is a detailed view illustrating one form of the seat unit of the present invention in position in the motor vehicle.
Figure 8:
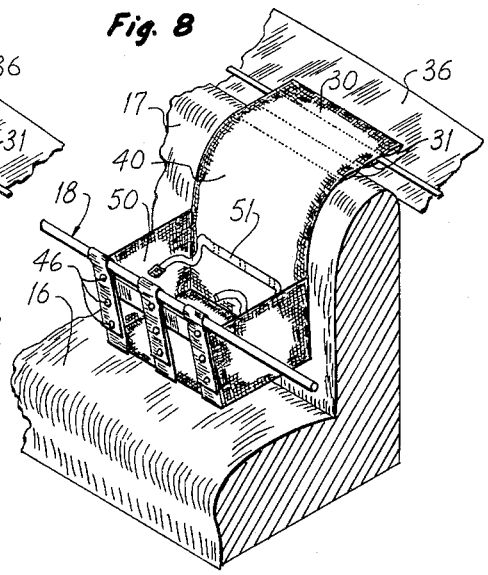
FIGURE 8 is a similar view of a modified form of the seat of FIGURE 7.
Figure 9:
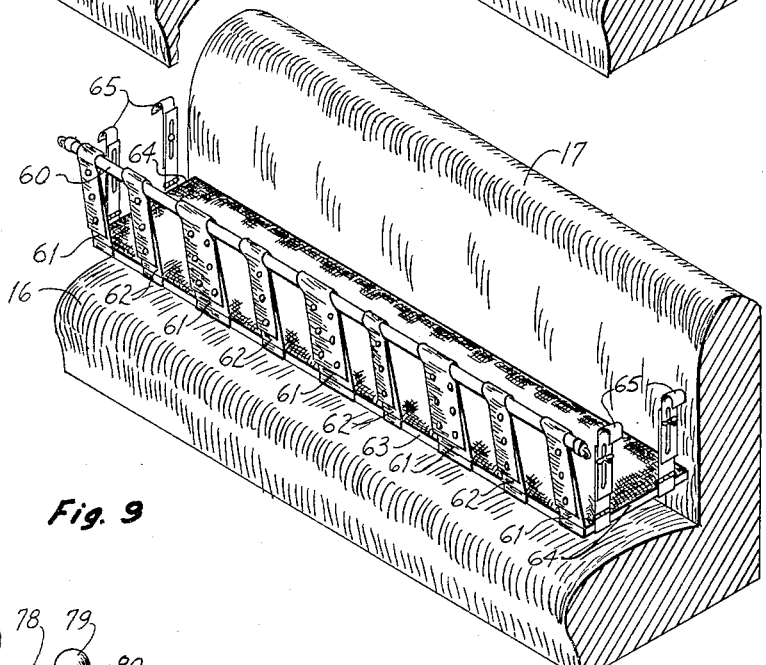
FIGURE 9 is a view illustrating a further modified form of seat.

Various types of seat units are indicated in the FIGURES 7, 8, and 9 of the drawings and as heretofore mentioned it is to be understood that the specific structure and details of arrangement here shown are not deemed to limit the invention to these particular units although such units are of themselves believed to be of patentable merit. In that form of unit shown in FIGURE 7 the apron 40 extends downwardly from its outer end 30 which defines the rod tunnels 31 over the rear cushion 17 to a midpoint 41 where it engages the rear of the forwardly extending generally horizontal seat or bottom portion 42. The bottom 42 extends forwardly in vertically spaced relation over the seat cushion 16 to a point intermediate the forward and rearward edges thereof. At the forward edge 43 of the bottom 42 there are attached corner straps 44 and a central vertical securing strap 45. Straps 44 and 45 pass over the horizontal bar 18, the bight of the straps being folded over the bar 18 to be adjustably secured as by buttons or snap fasteners as indicated at 46. As shown at 48 in FIGURE 7, horizontal straps may be provided extending between the end straps and the apron and a horizontal front strap 49 may be provided, both the straps 48 and 49 lending strength and security to the device. In that form of the invention shown in FIGURE 8, the sides of the seat are fully closed by side panels 50 in lieu of the horizontal strap 48 of FIGURE 7. In this form of the seat unit a belt 51 is provided which may be passed about the infant to secure the infant independent of the rod 18 and front strap arrangement.

Since the length of the straps may thus be adjusted as well as the adjustable securement of the free end 30 of the apron it will be understood that the seat may be conformed to various types of automobile seat constructions as well as to individual size of the occupants. In use, the infant's legs may straddle the central securing strap 45 as seen in FIGURE 12, precluding the child from slipping forwardly beneath the bar 18. The bar 18 not only provides a horizontal guard but gives a rigid support which the child may grasp. It may be noted that by a modification of the seat of FIGURE 8, removing the side panels 50, pairs of such units may be arranged in close proximity to form a bed for the horizontal support of a child. The units of FIGURE 7 may be likewise used with or without removal of the side straps 49.

By reference to FIGURE 9 it will be seen that a single seat unit may be provided for a number of infants and that such unit may not necessarily require the back apron arrangement as shown in FIGURES 7 and 8. In this form of the invention a horizontal rigid bar 60 is provided from which there depends a multiple of vertical broad straps 61 and intermediate narrower straps 62. In this type of arrangement the infant's limbs are adapted to straddle the narrower straps 62 while the broad straps define individual seat placements for the infants. The bar 60 may be secured in any way desired to the side walls of the tonneau or the doors of the vehicle as in the manner of FIGURES 2 and 3 or FIGURE 10 hereinafter referred to. The straps 61 and 62 attached to the bar 60 extend to the front edge of one elongated seat bottom 63. The ends 64 of the bottom 63 may be supported by adjustable hooks 65 extending upwardly from the ends of the seat to engage the window ledge or an equivalent portion of the vehicle structure.

Figure 10:
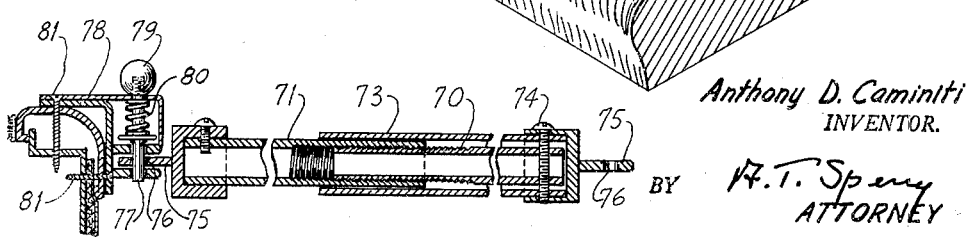
FIGURE 10 is a longitudinal section through a form of bar which is threadedly adjustable as to length as distinct from the spring retracted bar of FIGURES 2 and 3.

As hereinbefore indicated, the structure of the bar 18 may be varied and as shown in FIGURE 10 it is suggested that the bar may be threadedly telescoped. In this form of bar an inner externally threaded tubular member 70 is threadedly engaged with the internal threads of external threaded member 71. In this construction a protective tube 73 is joined by the bolt 74 with the inner externally threaded member 70 so as to preclude any danger of damage by contact with the threads. The outer ends of the tubular members 71 and 73 are shown as formed with the projecting ear 75 apertured as at 76 so as to receive the securing pin 77 mounted in a bracket 78 and operable by a knob 79 against tension of a spring 80. The bracket 78 may be secured to the vehicle by screws 81 in the same manner as the securement of brackets 26 of FIGURES 2 and 3. By this construction the bar may be adjusted to the desired length and form a fully rigid member which when engaged with a car door provides a positive lock.

While that form of the invention heretofore referred to contemplates the provision of a horizontal bar extending completely across the interior of the vehicle, it will be noted from FIGURE 11 that the invention is not limited to this particular construction. In FIGURE 11 there is shown a transverse bar 90, the outer end 91 of which may be secured into the car door or side wall by any suitable bracket such as indicated at 92. The inner end of the bar 90 is supported at 93 by a cross piece 94 the front of which may be engaged with the dashboard of the vehicle while the opposite end may be braced against the seat and supported thereby.

In carrying out the present invention it will of course be understood that the concept is not limited nor confined to any specific structural details herein shown. The seats may be of such number as may be required and such seats may be attached and removed at will. It will also be understood that while the invention may find its greatest adaptability to the provision of auxiliary seats for children to be arranged in a motor vehicle, the inventive concept is equally adaptable for living room or dining room furniture and for restaurants, hotels and the like. Therefore, in the practice of the invention it will be understood that numerous changes, modifications and the full use of equivalents may be resorted to without departure from the spirit or scope of the invention as outlined in the appended claims.

What I claim is:

1. The combination with the front seat of a motor vehicle of a transverse rigid bar disposed in spaced relation over a portion of said seat, means for supporting one end of said bar from the side of the vehicle, means for supporting the other end of the bar independently of the side of the vehicle and an infant's seat secured to said bar.

2. An auxiliary seat, for a vehicle having side wall members and a permanent seat cushion and back therefor, comprising a rigid bar, means at the ends of the bar for mounting the bar in fixed position transversely of the vehicle in spaced relation over a portion of said seat cushion including means for securing at least one end of the bar to the adjacent side wall member of the vehicle, a relatively rigid auxiliary seat bottom, front suspension means hanging the front edge of said bottom from said bar and having leg-admitting openings therein, and rear suspension means disposed over the permanent seat back and secured in fixed relation thereto and having its lower edge connected to the rear edge of said auxiliary seat bottom for cooperating with said front suspension means for supporting the auxiliary seat bottom spaced above the permanent seat cushion.

3. An auxiliary seat, for a vehicle having side wall members and a permanent seat cushion and back therefor, comprising a rigid bar including connections at its ends for securing the bar to the side wall members of the vehicle above the permanent seat cushion, a relatively rigid auxiliary seat bottom, front suspension means hanging the front edge of said bottom from said bar and having leg-admitting openings therein, and rear suspension means disposed over the permanent seat back and secured in fixed relation thereto and having its lower edge connected to the rear edge of said auxiliary seat bottom for cooperating with said front suspension means for supporting the auxiliary seat bottom spaced above the permanent seat cushion.

4. The combination claimed in claim 3, in which the bar comprises a pair of telescopically related sections adjustable to fit vehicles having side wall members spaced different distances apart.

5. The combination claimed in claim 3, in which the bar comprises a pair of tubular sections telescoped one within the other, with spring means inside the bar acting under tension to contract the length of the bar.

6. The combination claimed in claim 3, in which the side wall members of the vehicle are doors to which the ends of the bar are connected and which are held thereby against opening.

7. The combination claimed in claim 3, in which the vehicle has a deck behind the permanent seat back and the rear suspension means for the auxiliary seat comprises an apron having its rear end fastened to said deck.

References Cited in the file of this patent

UNITED STATES PATENTS

| | | |
|---|---|---|
| D. 174,004 | Schiffman | Feb. 8, 1955 |
| 1,125,005 | Clark | Jan. 12, 1915 |
| 1,363,667 | Mahr | Dec. 28, 1920 |
| 1,380,678 | Price | June 7, 1921 |
| 1,389,073 | Schlosser | Aug. 30, 1921 |
| 1,959,974 | Westgate | May 22, 1934 |
| 2,569,678 | Larson | Oct. 2, 1951 |
| 2,581,888 | Schlegel | Jan. 8, 1952 |
| 2,617,571 | Hart | Nov. 11, 1952 |
| 2,668,583 | Singer | Feb. 9, 1954 |
| 2,864,429 | Combs | Dec. 16, 1958 |